Oct. 9, 1962 D. L. GELLERT 3,057,993
LIGHTING FIXTURE WITH PRE-WIRED JUNCTION BOX
Filed July 21, 1960 2 Sheets-Sheet 1
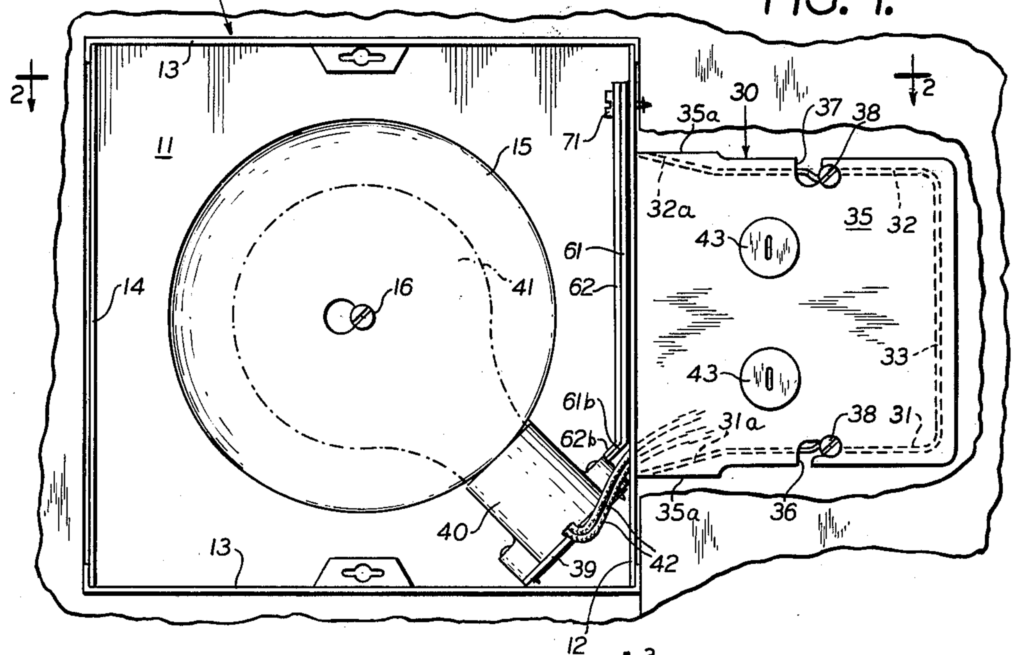
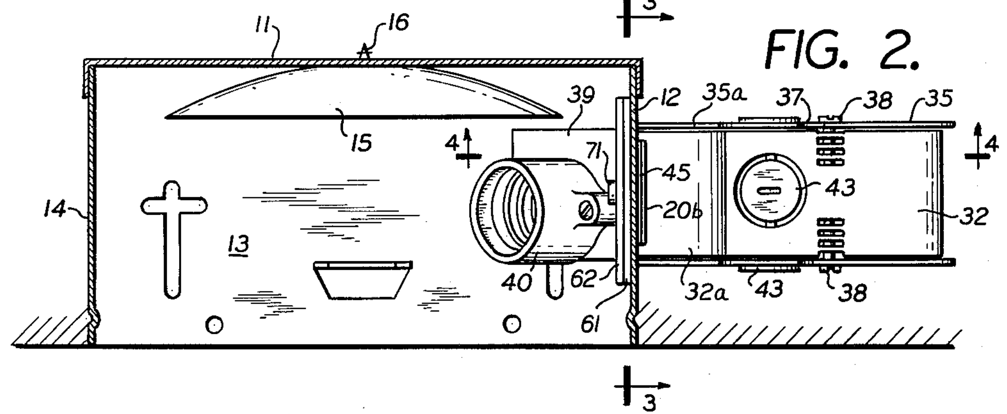
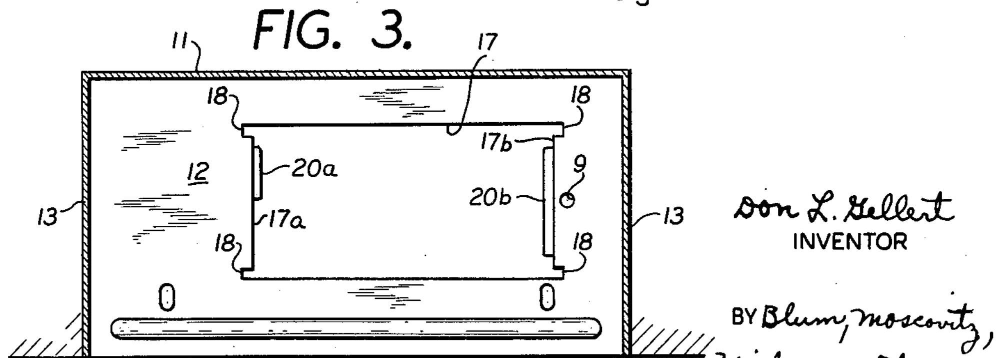
Don L. Gellert
INVENTOR
BY Blum, Moscovitz, Friedman & Blum
ATTORNEYS.

LIGHTING FIXTURE WITH PRE-WIRED JUNCTION BOX
Filed July 21, 1960 2 Sheets-Sheet 2
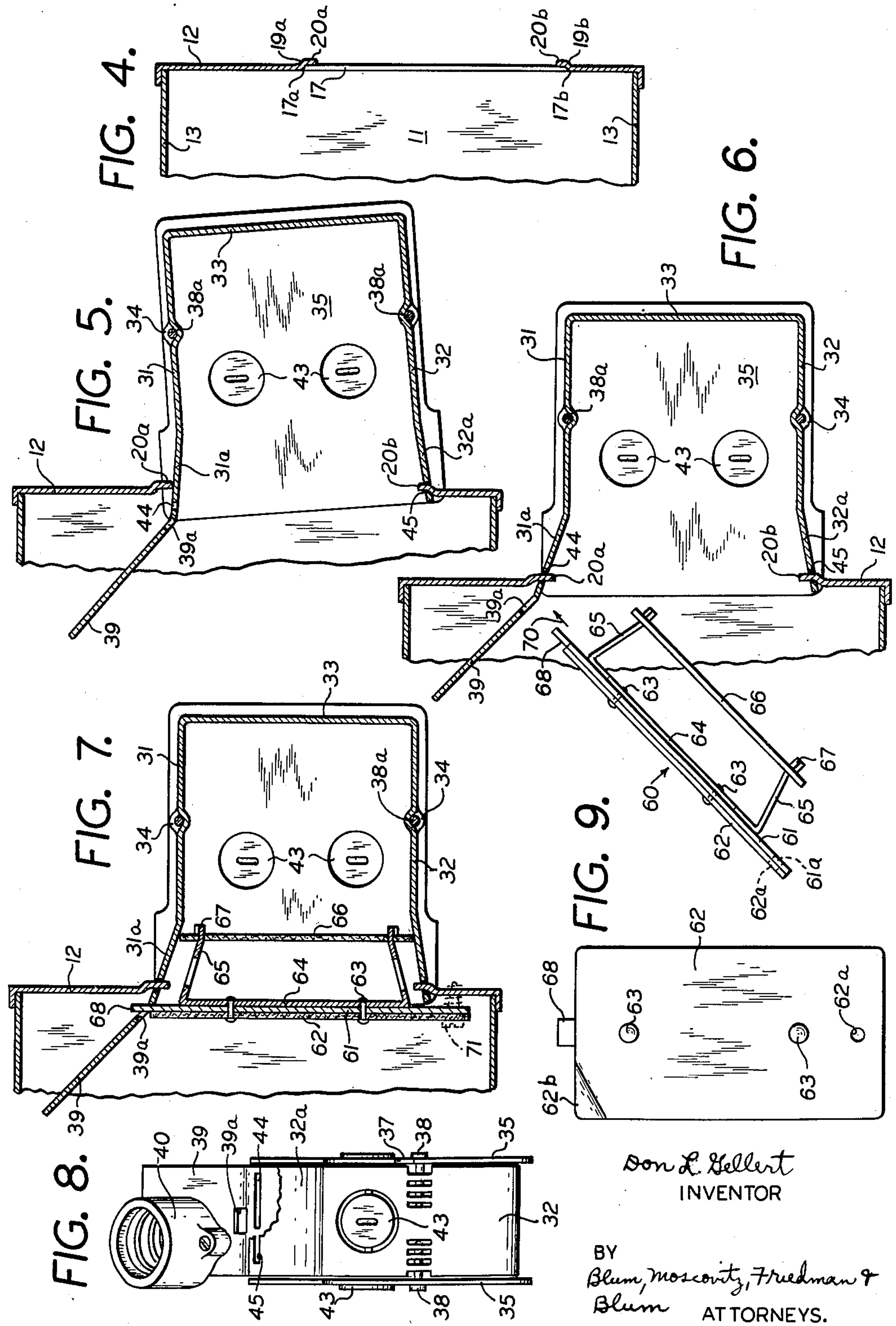
Don L. Gellert
INVENTOR
BY
Blum, Moscovitz, Friedman & Blum
ATTORNEYS.

United States Patent Office 3,057,993

Patented Oct. 9, 1962

1

3,057,993

LIGHTING FIXTURE WITH PRE-WIRED JUNCTION BOX

Don L. Gellert, Paramus, N.J., assignor to Litecraft Manufacturing Corporation, Passaic, N.J., a corporation of New York Filed July 21, 1960, Ser. No. 44,346
2 Claims. (Cl. 240—78)

This invention relates to an improved ceiling fixture having an attached junction box.

An important object of this invention is to provide an improved ceiling fixture having a detachable junction box which may be readily mounted in place on the fixture by manipulation of the junction box from the interior of the fixture.

Another object of this invention is to provide an improved detachable junction box of the above-described type, having a detachable cover for the junction box, wherein said junction box may be attached to the fixture without the use of screws, and wherein said cover will serve to further secure the junction box in place, by means of a single screw attaching said cover to the fixture.

In accordance with a preferred embodiment of the invention, the junction box is provided with opposed walls which are somewhat flexible and resilient, which have slots, and which are cam shaped. These walls cooperate with flanges on the fixture on either side of an opening in the side wall of the fixture, such that when the fixture box is moved outwardly through said side opening, the opposed walls are pressed inwardly by the flanges, and the flanges then drop into the slots, to secure the junction box in place. Said junction box has an extension on one of said walls which is located inside the fixture housing and which carries a lamp socket. This extension further has a slot which receives a tab on the junction box cover. The other side of the junction box cover is adapted to be screwed into the side wall of the fixture, thereby providing positive locking means, preventing complete separation of the fixture box from the junction box.

Other objects and advantages of this invention will become apparent from the following description, in conjunction with the annexed drawing in which a preferred embodiment of the invention is disclosed.

In the drawing:

FIG. 1 is a bottom plan view of the assembled fixture and junction box, showing the assembly mounted in a ceiling which is broken away.

FIG. 2 is a section on line 2—2 of FIG. 1.

FIG. 3 is a section on line 3—3 of FIG. 2, with the junction box removed from the fixture.

FIG. 4 is a fragmentary section on line 4—4 of FIG. 2, with the junction box removed from the fixture and with the lamp socket omitted.

FIG. 5 is a view similar to FIG. 4, showing the junction box partly inserted in the fixture, the lamp socket being omitted.

FIG. 6 is a view similar to FIGS. 4 and 5, showing the junction box entirely inserted in the fixture and showing the cover about to be inserted in the fixture, the lamp socket being omitted.

FIG. 7 is a view similar to FIGS. 4–6, but showing the complete assembly.

FIG. 8 is an elevational view of the junction box, viewed through the opening thereof.

FIG. 9 is an elevational view of one side of the cover.

Upon reference to the drawing in detail, it will be noted that it shows a fixture box 10 of rectangular shape. This fixture box 10 has a top wall 11 which is optionally square, longitudinally extending side wall 12 upon which junction box 30 is mounted, front and rear laterally extending walls 13 and a remaining longitudinally extending side wall 14. The exact details of the assembly of the walls of the junction box, the means for mounting the box in a ceiling, and the manner of attachment of a diffuser to the open bottom of the box, are all conventional and are not shown in detail. The diffuser is omitted from the drawing. Reflector 15 is fixed to the top wall 11 of fixture box 10 by means of screw 16, in the usual manner.

2

Side wall 12 has a fixture box side opening 17 which is preferably rectangular and the edges of which extend respectively horizontally and vertically when the fixture is mounted in a horizontal ceiling. Preferably, opening 17 is laterally elongated. Opening 17 has respective side edges **17*a* and 17*b*. Side wall 12 has respective notches 18 extending laterally outwardly from the respective edges 17*a* and 17*b*** at the respective upper and lower ends thereof.

Wall 12 has a flange **19*a* connecting with edge 17*a* and extending outwardly therefrom. Said flange 19*a* also extends vertically. At its inner end, flange 19*a* connects with a further flange 20*a* which extends toward edge 17*b* and which is parallel to and outwardly located with respect to wall 12. Similarly, flange 19*b* connects with edge 17*b* and extends vertically and also outwardly from wall 12. The outer edge of flange 19*b* connects with flange 20*b* which extends toward edge 17*a* and also extends vertically and is parallel to and located outwardly of wall 12. Preferably, said flanges 20*a* and 20*b* are co-planar and are only slightly offset with respect to wall 12. Preferably, flanges 19*a* and 20*a* are co-extensive in height. Preferably, flanges 19*b* and 20*b* are co-extensive in height and centrally located with respect to edge 17*b* and extend almost the entire length thereof between notches 18. Preferably, flanges 19*a* and 20*a* are approximately half the length of flanges 19*b* and 20*b*; and the upper edges of flanges 19*a* and 20*a* are in the same horizontal plane as the upper edges of flanges 19*b* and 20*b*, so that the lower edges of flanges 19*a* and 20*a* are at approximately the mid-point of flanges 19*b* and 20*b***.

Junction box 30 has a laterally and vertically extending wall 31 located and shaped for engagement with flange **20*a*, and has a further laterally and vertically extending wall 32 located and shaped for engagement with flange 20*b*. These walls 31 and 32 are connected at their outer ends (remote from fixture box 10) by means of longitudinally and vertically extending wall 33. Each said wall 31 and 32 is shaped to provide vertically extending, registering threaded sockets 34 extending to the respective upper and lower ends thereof. These sockets 34 of the respective walls 31 and 32 are preferably longitudinally aligned and are preferably located somewhat closer to wall 33 than to the inner ends of walls 31 and 32**.

Junction box 30 also comprises respective upper and lower plates 35. Each said plate 35 is generally rectangular, except for front and rear wings **35*a* extending longitudinally therefrom at the inner end thereof. Said plate 35 has respective slots 36 and 37 in the front and rear edges thereof, which are positioned to receive respective screws 38 with the head of screw 38 abutting the outside of plate 35 and with the shank 38*a* of screw 38 extended through the respective slot 36 or 37 screwed into a respective socket 34. Preferably, said screws 38 are the sole means attaching plate 35 to walls 31 and 32**.

The main portions of walls 31 and 32 are substantially parallel to each other. However, within the region of plate wings **35*a*, as shown in broken lines in FIG. 1 and as is also shown in FIG. 6, wall portions 31*a* and 32*a* diverge from each other towards the interior of box 10. Wall portions 31*a* and 32*a* may be considered as being inclined longitudinally forwardly or rearwardly, as the case may be, with respect to walls 31 and 32. Wings 35***a* completely overlie wall portions 31*a* and 32.

The metal of walls 31 and 32 is somewhat flexible and resilient, so that the walls 31 and 32 may be flexed toward each other, inwardly of the screws 38, whose shanks 38*a* serve as pivots. The wall portions 31*a* and 32*a* serve as cams which may be suitably engaged for flexing of the walls 31 and 32.

Wall 31 has an extension 39 which extends inwardly of the main portion of junction box 30 and which is inclined away from the inside opening of the junction box, at an angle of approximately 45° to the plane of the main portion of wall 31. Socket 40 is fixed to a face of wall extension 39 so as to project towards the center of fixture box 10 when junction box 30 is assembled therewith. Lamp 41, shown in broken lines in FIG. 1, is adapted to be screwed into socket 40 in the usual way.

The usual leads 42 may be connected to socket 40 in the usual way and project outwardly therefrom. These leads 42 extend through the inner side opening of junction box 30 into the interor thereof and may be connected with external leads (not shown) which may be drawn through plates 35 or walls 31, 32 or 33, by means of the usual knockouts 43.

Adjacent the inner end of wall 31, in the inclined portion 31*a*, the wall is provided with a vertical slot 44. Similarly, wall 32 has a vertical slot 45 in inclined portion 32*a*, adjacent the inner end thereof. Slot 45 is relatively long and is centrally located with respect to the upper and lower edges of wall 32 and is sized and positioned for reception of flange 30*b*. Slot 44 is approximately half the length of slot 45, and is positioned in the upper half of wall 31 and is sized and positioned for reception of flange 20*a*.

Wall extension 39 has a slot 39*a* mid-way between the top and bottom edges thereof, adjacent its connection with wall portion 31*a*.

In order to assemble junction box 30 with fixture box 10, either before or after the external cable has been brought into the junction box and either before or after the external cable has been attached to the leads 42, the junction box is brought upwardly into the bottom opening of the fixture box, and wall 33 brought into registration with opening 17 and with plates 35 parallel to wall 11. The junction box is then extended outwardly through opening 17, there being ample clearance between plates 35 and the upper and lower edges of opening 17 and between walls 31 and 33 and the inner edges of flanges 20*a* and 20*b*.

Upon further outward movement of junction box 30, wings 35*a* extend slidably through the respective notches 18. Upon still further outward movement of the junction box, the diverging wall portions 31*a* and 32*a* respectively engage against flanges 20*a* and 20*b*. The result is to cause inward flexing of the walls 31 and 32 towards each other, until the flanges 20*a* and 20*b* respectively snap into slots 44 and 45. Optionally, the two flanges may snap into the respective slots simultaneously. Optionally, also, one flange may snap into its slot ahead of the other. This is illustratively shown in FIG. 5 in which flange 20*b* is shown as engaged within slot 45, prior to the entrance of flange 20*a* into slot 44. FIG. 6 shows the fully assembled junction box and fixture box, with flange 20*a* now received within slot 44.

In the assembled condition of junction box 30 and fixture box 10, the walls 31 and 32 are in their normal parallel position, and wall portions 31*a* and 32*a* respectively substantially abut opening edges 17*a* and 17*b*. In other words, the distance between the front and rear edges of opening 17 is substantially equal to the distance between slots 44 and 45, but the distance between the two flanges 20*a* and 20*b* is less than the normal distance between the two slots 44 and 45. Flanges 20*a* and 20*b* releasably lock junction box 30 on fixture box 10.

Cover 60 for junction box 30 includes a generally rectangular plate 61. Insulating sheet 62 is fixed to the inner face of plate 61 by means of rivets 63. A heat baffle is supported by means of a strap 64 which extends longitudinally and which is fixed to the outside of plate 61 by means of the aforesaid rivets 63. Legs 65 extend outwardly from strap 64 and are spaced from the front and rear edges of plate 61. Insulating heat baffle plate 66 is mounted on tabs 67 of legs 65 by any suitable means and is parallel to and spaced from plate 64. Registering holes 61*a* and 62*a* respectively extend through plate 61 and insulating sheet 62 adjacent one vertical edge of cover plate 61. Co-planar tab 68 extends beyond the other vertical edge of plate 61, halfway between the upper and lower edges thereof.

In the assembly of cover 60 and junction box 30, plate 61 is located in fixture box 10 and is initially oriented so as to be transverse to and spaced from plate extension 39, with tab 68 proximate to and aligned with slot 39*a*. Cover assembly 60 is then moved toward plate extension 39 in the direction of arrow 70, to bring tab 68 into slot 39*a*. Cover assembly 60 is then pivoted on tab 68 to bring the heat baffle assembly into junction box 30 and to bring the plate 61 against the inner opening of junction box 30. Plate 61 completely overlies said inner opening of junction box 30. In this position, the holes 61*a* and 62*a* register with hole 9 in wall 12 adjacent flange 19*b*. Sheet metal screw 71 may then be extended through the holes 62*a* and 61*a* and may be threaded through hole 9. Registering corners 61*b* and 62*b* of plate 61 and sheet 62 adjacent socket support 39 are bent inwardly to provide a clearance space for entrance of leads 42 into junction box 30.

It will thus be apparent that the junction box and fixture box may be assembled without a single screw, and that the assembly of the cover plate requires only a single screw. Furthermore, since the plate 61 of cover assembly 60 is mounted at one end thereof upon plate extension 39 by means of the extension of tab 68 through slot 39*a*, and since the other end of plate 61 is secured by screw 71 to wall 12 of the main fixture housing 10, a positive lock of fixture box 30 to housing 10 is accomplished. The tab 68 can engage against wall 12, beyond flange 20*b*, to serve as a stop to outward movement of junction box wall 31. Furthermore, wall extension 39 abuts the proximate vertical edge of plate 61, to prevent flexing of wall portions 31*a* in such a way as to clear flange 20*a*. Hence, even in the extremely unlikely possibility that wall portion 32*a* should become separated from flange 20*b* and should swing outwardly, the junction box would not become entirely separated from the fixture box.

While a preferred embodiment of the invention has been disclosed, and various possible changes, omissions and additions have been indicated, it will be apparent that various other changes, omissions and additions may be made in the invention without departing from the scope and spirit thereof.

The drawing is substantially to scale of a working model of the invention, and reference is made to the drawing to complete this disclosure.

What is claimed is:

1. A combination lighting fixture comprising a lighting fixture box, said fixture box having a bottom opening and having a side wall having a side opening, said side wall having integral flanges that extend partly across said side wall opening, and a junction box, said junction box having an outer portion remote from the fixture box including side walls the dimensions of which are such that said junction box will pass through said fixture box side wall opening from the interior thereof to the exterior thereof, said junction box having an inner portion adjacent the fixture box including side walls having diverging portions which engage said flanges during movement of said junction box through the opening, said junction box walls being flexible and resilient so that said inner portion side walls are flexed inwardly by said flanges during said movement of said junction box, said junction box inner portion side walls having slots removably receiving said flanges thereby releasably locking said junction box in place, one of said inner wall portions having an extension, said extension extending through the side wall opening and into the interior of the fixture box at an angle to said fixture box side wall, said extension having an extension slot, and a cover for the inner portion of said junction box, said cover having a side tab removably received within said extension slot, said cover extending across the side opening, and means releasably securing the cover to the side wall at a point remote from the tab, said tab being thereby retained within said extension slot.

2. A combination lighting fixture in accordance with claim 1, said extension having a lamp socket fixedly mounted directly thereto, said socket extending in a general diagonal direction toward the interior of said fixture box, said socket removably receiving an electric bulb, said bulb thereby being located at substantially the center of said fixture box.

References Cited in the file of this patent

UNITED STATES PATENTS

| | | |
|---|---|---|
| 854,045 | LaPaugh | May 21, 1907 |
| 2,757,818 | Chamberlain | Aug. 7, 1956 |
| 2,767,307 | McGinty et al. | Oct. 16, 1956 |
| 2,842,281 | Chisholm | July 8, 1958 |